United States Patent [19]

Ernst et al.

[11] 4,123,121
[45] Oct. 31, 1978

[54] BALL BEARING ASSEMBLY WITH PLURALITY OF BALL GUIDEWAYS

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Industrial Trading & Development Company B.V., Nieuwegein, Netherlands

[21] Appl. No.: 750,421

[22] Filed: Dec. 14, 1976

[30] Foreign Application Priority Data

Dec. 19, 1975 [DE] Fed. Rep. of Germany ....... 2557351

[51] Int. Cl.² .............................................. F16C 31/06
[52] U.S. Cl. ..................... 308/6 C; 64/23.7; 308/201
[58] Field of Search .......... 308/6 C, DIG. 7, DIG. 8, 308/185, 188, 189, DIG. 11, 3.5, 6 R, 36.1, 187.1, 187.2, 187, 201, 6 B; 64/23.7; 192/44, 45

[56] References Cited

U.S. PATENT DOCUMENTS

| 2,451,359 | 10/1948 | Schlicksupp | 308/6 B |
| 3,318,109 | 5/1967 | Ressler et al. | 308/6 C X |
| 3,545,826 | 12/1970 | Magee et al. | 308/6 C |

FOREIGN PATENT DOCUMENTS

| 1,907,856 | 1/1970 | Fed. Rep. of Germany | 308/6 C |
| 2,348,231 | 3/1975 | Fed. Rep. of Germany | 308/6 C |

Primary Examiner—Stephen G. Kunin
Assistant Examiner—Douglas C. Butler
Attorney, Agent, or Firm—Daniel M. Rosen

[57] ABSTRACT

A ball bearing comprising an outer sleeve with raceways formed therein, and having an axial bore and a retainer including a plurality of ball guideways distributed over the periphery thereof. The ball guideways comprise axial guideway sections and semicircular deflecting way sections connecting the axial guideway sections by pairs; the outer sleeve has a length which corresponds to the length of the axial guideway sections in the retainer, the retainer being made of synthetic material and projecting with the semicircular deflecting way sections beyond the outer sleeve; and end rings mounted on projecting sections of the retainer for covering the deflecting zone.

13 Claims, 13 Drawing Figures

BALL BEARING ASSEMBLY WITH PLURALITY OF BALL GUIDEWAYS

The present invention relates to bearings, and particularly to linear motion ball bearings.

A conventional linear motion ball bearing comprises an outer sleeve with raceways having axial bores and a retainer with several ball guideways. These ball guideways are distributed over the periphery of the retainer and comprise axial guideways with semicircular deflecting ways connecting these guideways by pairs, and endless ball races located in these ball guideways.

With known designs of this type, the retainer has a width which, as a rule, is equal to or less than the width of the outer sleeve. Frequently, the end sections of the outer sleeve hold end rings which serve both to axially fix the retainer and as carriers for a gasket.

There is also known in the art a ball guideway comprising a sleeve with axial guideways for the balls of the loaded and nonloaded zone. At the face side, there are end rings in which the deflecting ways for the balls are located. The various sections of this ball guideway are connected via a slide-over sheet metal sleeve which is flanged at the ends (German Utility Pat. No. 7,018,259).

In other prior art, it is known to provide a series of ball guideways where the raceways for the bearing balls and for the returning balls are worked into a sleeve, with end rings of sheet metal or solid material fastened to the ends of the sleeve. These end rings contain the deflecting ways for the balls (U.S. Pat. Nos. 2,559,292 and 3,552,806).

With these known designs, the raceways for the bearing balls are contained in the bore of the sleeve, and the return raceways have the form of slots or channels in the jacket, or as completely enclosed axial bores in this sleeve. Such designs are very difficult to manufacture. In addition, the raceways for the balls are interrupted at the transition to the deflecting zones. Since these end rings are fastened to the face sides of the sleeves, it is possible, due to manufacturing tolerances, that a shift of the raceways in the peripheral direction may occur. This interferes with the perfect running of the balls in the deflecting ways. Due to this shifting of the end rings, the balls may enter the load zone at a point which is not precisely at the lowest raceway point. This leads to heavy wear at the entry to the bearing (load-carrying) zone.

A design is also known where a sheet metal retainer with endless ball guideways is located in the bore of the outer sleeve. In the area of the deflecting zone, the bore of the outer sleeve mounts separate end caps which have a curved raceway for the balls (U.S. Pat. No. 3,318,109). With these known designs, the balls in the deflecting zone make metal contact with the retainer and with the end caps. This has the disadvantages of noise and wear occurring as a result of a ball accumulation (stagnation) effect which is unavoidable in the deflecting zone. Also, because of the restricted cross-sectional height of the end caps, only small diameter balls can be used and thus the load bearing or loading capacity of this known design is thereby limited.

It is thus the prime object of the present invention to provide a ball bearing whose parts can be manufactured more easily and more economically and which can be assembled with greater ease, is less subject to wear, particularly in the deflecting zones, operates with little noise and is more resilient at the ends to shaft deflections.

The foregoing object of the present invention is achieved by providing the outer sleeve, whose bore holds axial raceways and return ways for the balls, with a length which corresponds to the length of the axial guideway sections in the retainer. The retainer is made of synthetic material and projecting with said semicircular deflecting way sections beyond the outer sleeve. End rings, made for example, from synthetic material, are placed on the projecting sections of the retainer for covering the deflecting zones against the outside.

As a result of these measures in accordance with the present invention, the outer sleeve can be easily manufactured. For example, an extruded pipe with a profiled inside crosssection can be employed. The raceways for the balls of the loaded zone and of the return zone are straight. The length of the outer sleeve does not extend over the entire length of the ball bearing, so that, on the one hand, material is being saved, and on the other hand, the angular mobility during shaft deflection is improved. By using a retainer of synthetic material which contains the deflecting ways for the balls and by covering these deflecting ways by the end rings which also are made of synthetic material, no metallic contact of the balls takes place in the defleting zones. Hence, the ball bearing in accordance with the present invention operates at a low noise level. Since the entire closed ball raceway is worked into the retainer, there is no shifting of the individual raceway portions and, as a result, the running of the balls is undisturbed and the wear is small. Because the end rings are made of synthetic material, the entire ball bearing is more flexible at the ends, and thus it can adapt better to shaft deflections.

In accordance with other improvments of the present invention, the end rings may be made of one piece or of several segments and may be provided on the jacket with a groove for holding a snap ring for axially fixing the ball bearing.

The individual sections can be combined into one unit, and installed by welding or peening between retainer and end rings. Of course, it is also possible to provide radial projections at the end rings which are directed inwards and are snapped into associate recesses in the jacket surface of the retainer. Another type of fastening involves fastening the end rings through grooves or the like on the jacket of the outer sleeve, with projecting lugs of the end rings snapping into these grooves.

Finally, it is possible to provide the end rings with axially projecting prominences which engage axial grooves, pleats, or the like in the outer sleeve. In a preferred embodiment, these axial grooves may be radial slots, with these slots separating the raceways from the remaining material of the outer sleeve, so that the raceways in this region can give elastically, thereby improving the entry and exit of the balls into the loaded zone.

Further improvements of the present invention will be described in detail by means of the following more detailed description and appended drawings, wherein.

Figure 1:
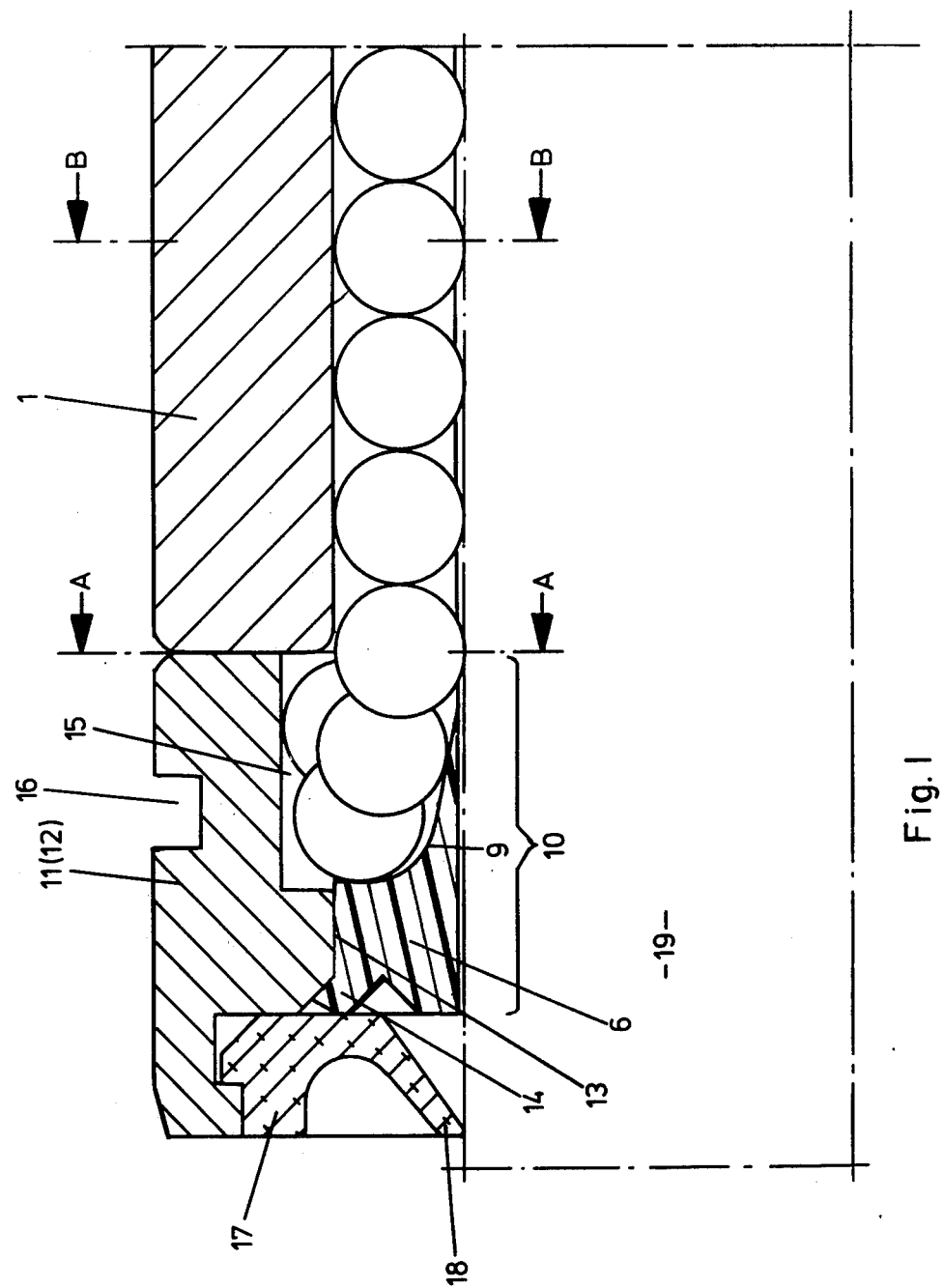
FIG. 1 shows a lengthwise section through the ball bearing in accordance with the present invention.
Figure 2:
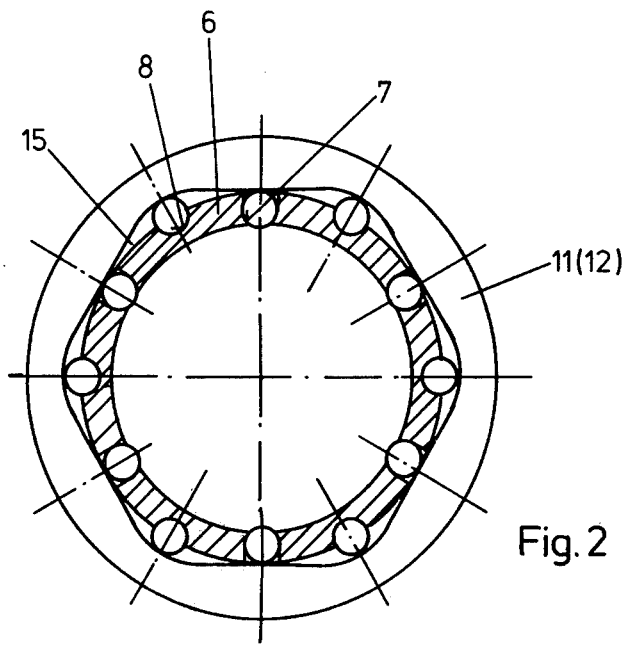
FIG. 2 shows a section taken along line A—A of FIG. 1.
Figure 3:
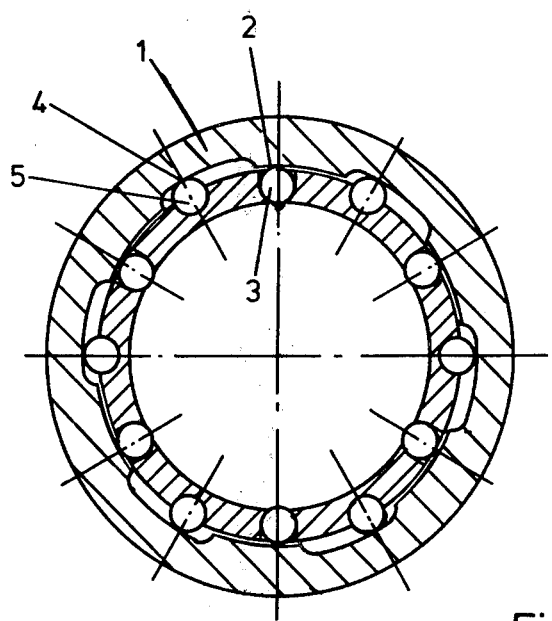
FIG. 3 shows a section taken along line B—B of FIG. 1.

The ball bearing of FIGS. 1 through 3 and 12 comprises an outer sleeve 1, whose bore contains the raceways 2 for the balls 3 of the loaded zone and the return raceways 4 for the balls 5 of the return one. A retainer 6, preferably made of synthetic material includes axial guideways 7 and 8 and semicircular deflecting ways 9, connecting the guideways at their ends, for the balls 3 and 5 arranged in an endless row. The end rings 11 or 12 are slid over portions 10 of the retainer, and project beyond the outer sleeve 1. The outer sleeve 1 has a length which corresponds to the length of the straight guideway sections 7 or 8 in retainer 6. The portions of retainer 6 which project beyond the outer sleeve 1 carry, as noted above, the semicircular deflecting portions or turn-around zones 9 for the balls and a centering surface 13 for the end rings 11 or 12 placed over these projecting portions 10 of the retainer. For fastening the end rings on the projecting portions of the retainer, the face side of the retainer is peened as shown at 14. The end rings 11 or 12 have recesses 15 in the area of the deflecting zones in order to ensure perfect deflection of the balls. The groove 16 in the end ring is used for holding a snap ring 11a, 12a for axially fixing the ball bearing in a housing. In the portion of each end ring 11 or 12, projecting beyond retainer 6, a gasket 17 is snapped in or inserted. The sealing lip 18 of the gasket 17 rides on the cylindrical surface of shaft 19.

Figure 4:
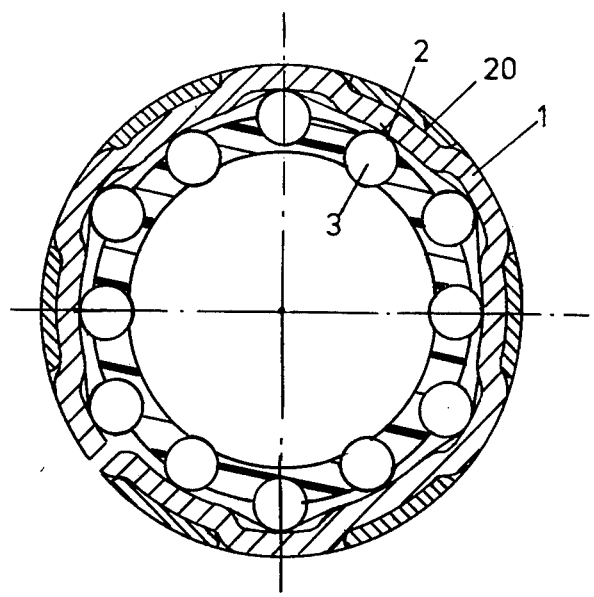
FIG. 4 shows a cross-section of the bearing according to second embodiment of the present invention.
Figures 5, 6:
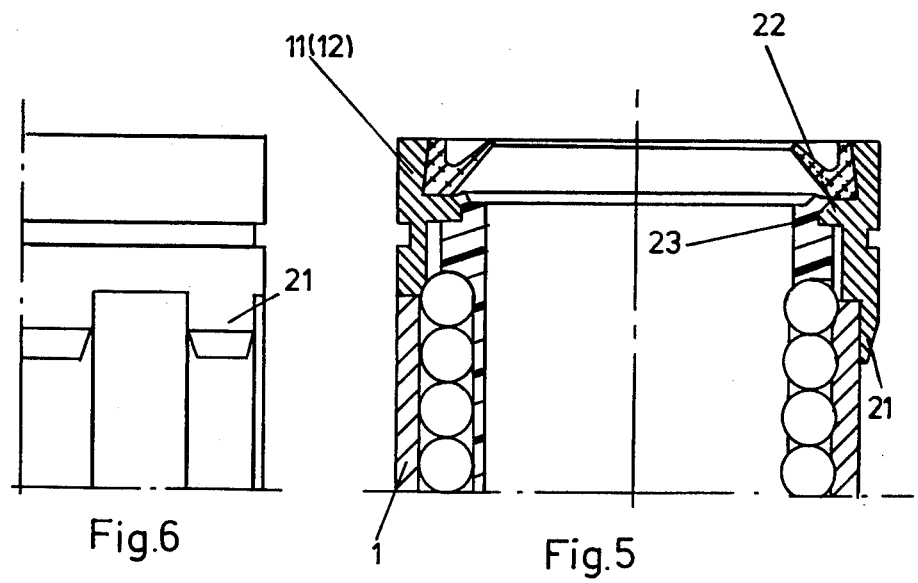
FIG. 5 shows a lengthwise section of the bearing of FIG. 4.
FIG. 6 shows a top view of the ball bearing of FIG. 4.

In the embodiment of FIGS. 4 through 6, the outer sleeve 1 is made from a sheet metal tube. By impressing axial creases 20, the raceways 2, projecting inwards, for the balls 3 of the loaded zone are created. The end rings 11 and 12 are provided with axially directed projections 21 distributed over the periphery which engage the creases 20 of the outer sleeve 1. For fastening individual parts, the end rings 11 or 12 are provided with radial projections 22 in the bore which engage associated recesses 23 on retainer 6 and are held by material projections formed on the retainer.

Figure 8:
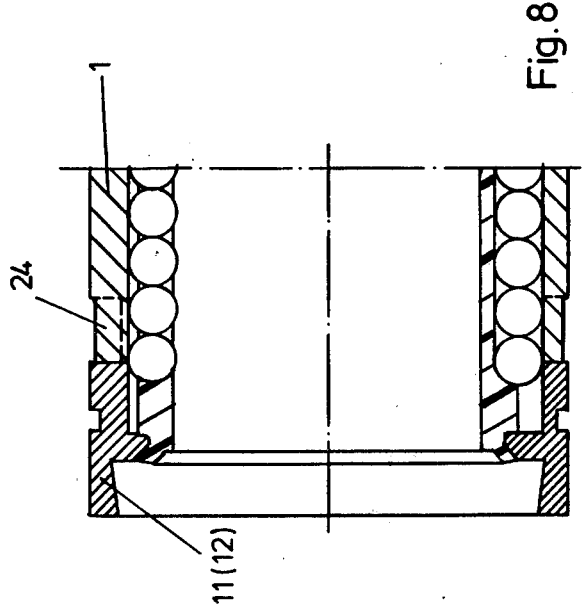
FIG. 8 shows the lengthwise section of a ball bearing of FIG. 7.
Figure 9:
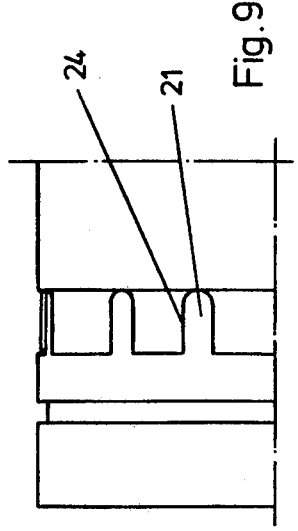
FIG. 9 shows a top view of the ball bearing of FIG. 7.
Figure 7:
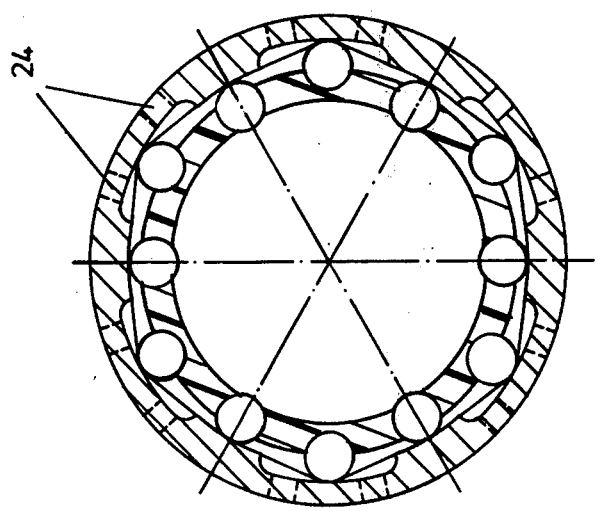
FIG. 7 shows a cross-section of a third embodiment of a ball bearing in accordance with the present invention.

In the embodiment shown in FIGS. 7 through 9, the outer sleeve 1 is a pipe section with profiled bore. In the area of the end zones, it has axial slots 24 which engage the axial projections 21 of end rings 11 or 12, respectively. Through these axial slots 24, the raceways 2 in this region are separated from the remaining outer sleeve, and hence can give elastically, thus improving the entry and exit for the balls into or from the bearing zone.

Figure 10:
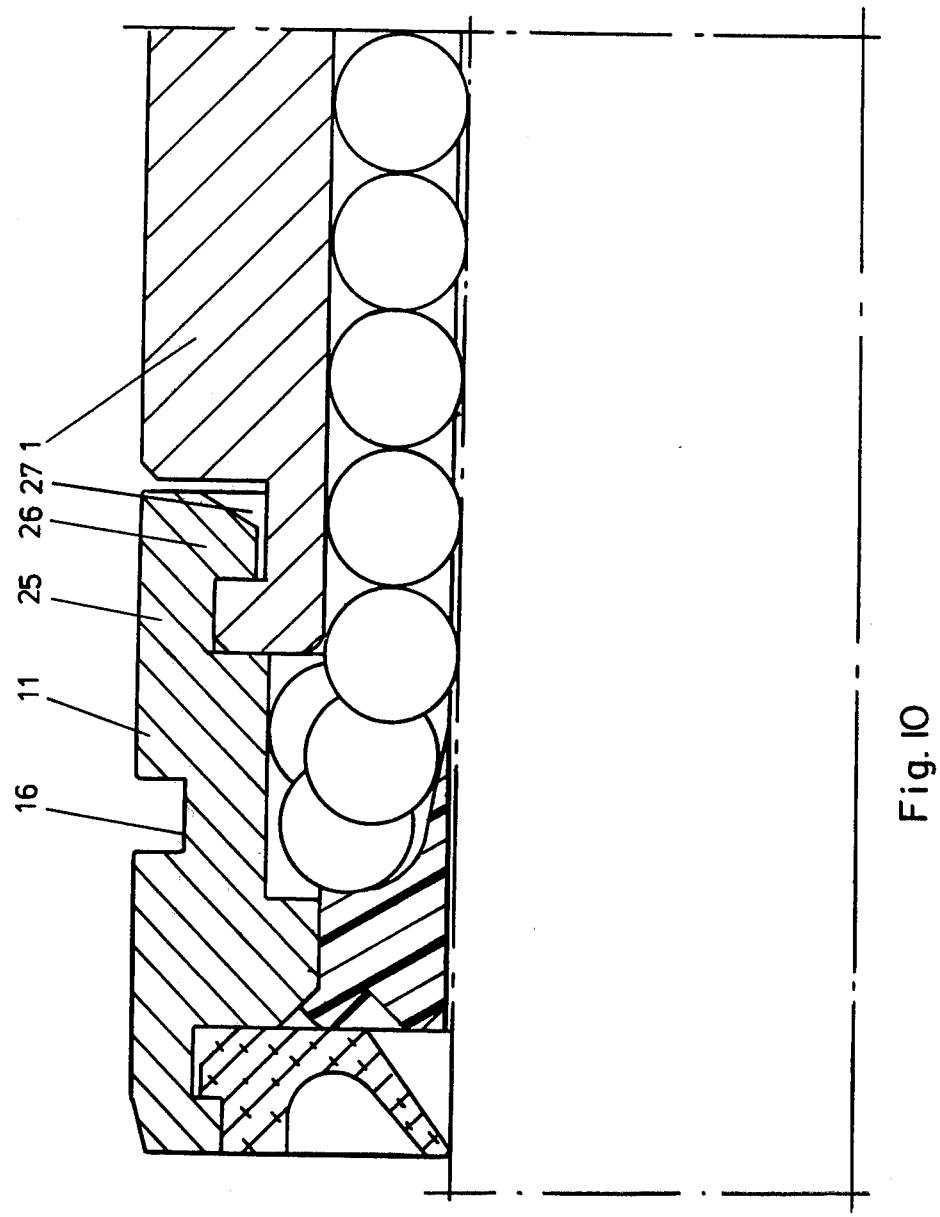
FIG. 10 shows a partial lengthwise section through a ball bearing in accordance with still another embodiment of the present invention with a different type of mounting for the end rings.

FIG. 10 shows an embodiment where the end ring 11 (12) is provided with an axial extension 25 which has one or several radially projecting lugs 26 which engage an annular groove 27 of outer sleeve 1.

Figure 11:
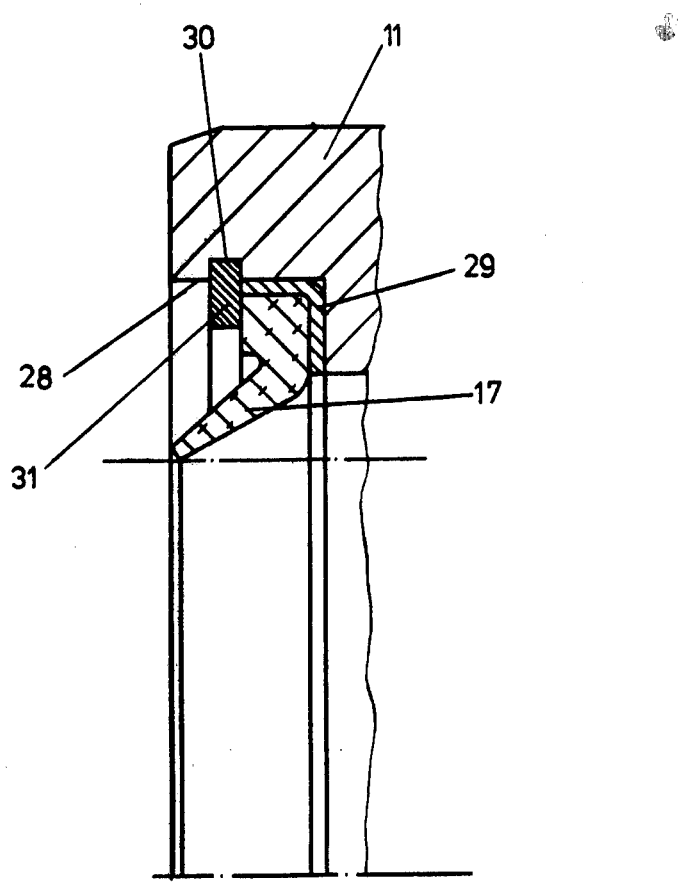
FIG. 11 shows a special gasket for use in the ball bearing in accordance with a further embodiment of the present invention.

FIG. 11 shows an end ring 11 in whose bore 28 a gasket 17 with a reinforcement 29 is installed. To axially hold the gasket 17 from moving outwards, a snap ring 31 is installed in an annular groove 30 in the bore 28 of end ring 11.

Figure 13:
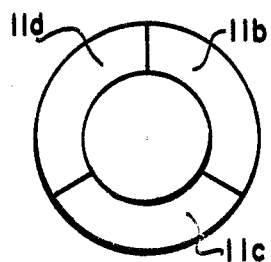
FIG. 13 illustrates, on a reduced scale, the end view of a modification of an end ring in accordance with the invention, wherein the end ring is formed of a plurality of segments, such as segments 11d, 11b and 11c.
Figure 12:
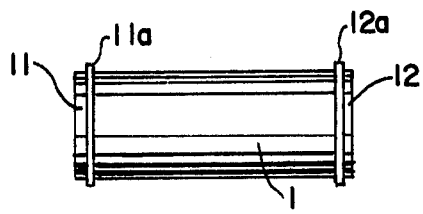
FIG. 12 is a plan view, on a reduced scale, of a bearing in accordance with FIG. 1, showing the snap rings.

FIG. 13 illustrates, on a reduced scale, the end view of a modification of an end ring in accordance with the invention, wherein the end ring is formed of a plurality of segments, such as segments 11a, 11b and 11c.

The present invention is not restricted to the embodiments shown. Other variations and modifications not shown will be apparent to those skilled in the art as within the spirit and scope of the present invention.

What is claimed is:

1. In a ball bearing for linear motion having an outer sleeve with a bore, a retainer within said bore, said retainer and bore defining a plurality of endless raceways each having a pair of straight central portions joined at their ends by semicircular deflecting portions, the radially outer running surfaces of said raceways being defined by said bore, whereby the straight central portions of each said pair are circumferentially displaced in said ball bearing with respect to one another, and balls filling each of said endless raceways; the improvement wherein said sleeve has an axial length coextensive substantial only with said straight central portions of said raceways, said retainer extending axially beyond each end of said sleeve and having semicircular grooves in its radially outer surface for defining the radially inner running surfaces of said semicircular deflecting portions, and further comprising end rings at each end of said sleeve and affixed to the ends of said retainer which extend axially beyond said sleeve, said end rings radially outwardly covering said semicircular deflecting portions of said raceways.

2. The ball bearing as defined in claim 1, wherein each said end ring is made of one piece.

3. The ball bearing as defined in claim 1, wherein said end rings are provided with a groove for holding a snap ring.

4. The ball bearing as defined in claim 1, wherein said end rings are connected to said retainer by welding or peening.

5. The ball bearing as defined in claim 1, wherein said end rings are each provided with radial projections and said radially outer surfaces of said retainer are provided with corresponding recesses which engage said projections.

6. The ball bearing as defined in claim 1, wherein said ends of said sleeve have annular grooves and each end ring is provided with an annular axial extension which has radially inward lugs which engage one of said annular grooves.

7. The ball bearing as defined in claim 1, wherein for protection against twisting or turning, said end rings are provided with a plurality of projections extending axially therefrom and said sleeve has mating end surfaces engaging said projections.

8. The ball bearing as defined in claim 7, wherein said axial means comprise axial grooves formed as radially continuous slots.

9. The ball bearing as defined in claim 1, comprising gaskets installed in said end rings.

10. The ball bearing as defined in claim 1, wherein each said end ring is made of several segments.

11. The ball bearing of claim 1 wherein said retainer is of a synthetic material.

12. The ball bearing of claim 1 wherein said retainer has axially extending grooves in the radially outer surface corresponding to one straight central portion of each pair of central portions, for defining a raceway for balls not under load disposed in the respective raceway, and axially extending slots aligned with the other straight central portion of each pair of straight central portions for defining raceway portions for balls under load.

13. The ball bearing of claim 12 comprising means for holding said rings against circumferential displacement with respect to said sleeve.

* * * * *